Sept. 22, 1970     R. W. CARLSON     3,529,468
METER FOR MEASURING COMPRESSIVE STRESS
IN EARTHEN MASSES AND THE LIKE
Filed Jan. 2, 1968     2 Sheets-Sheet 1
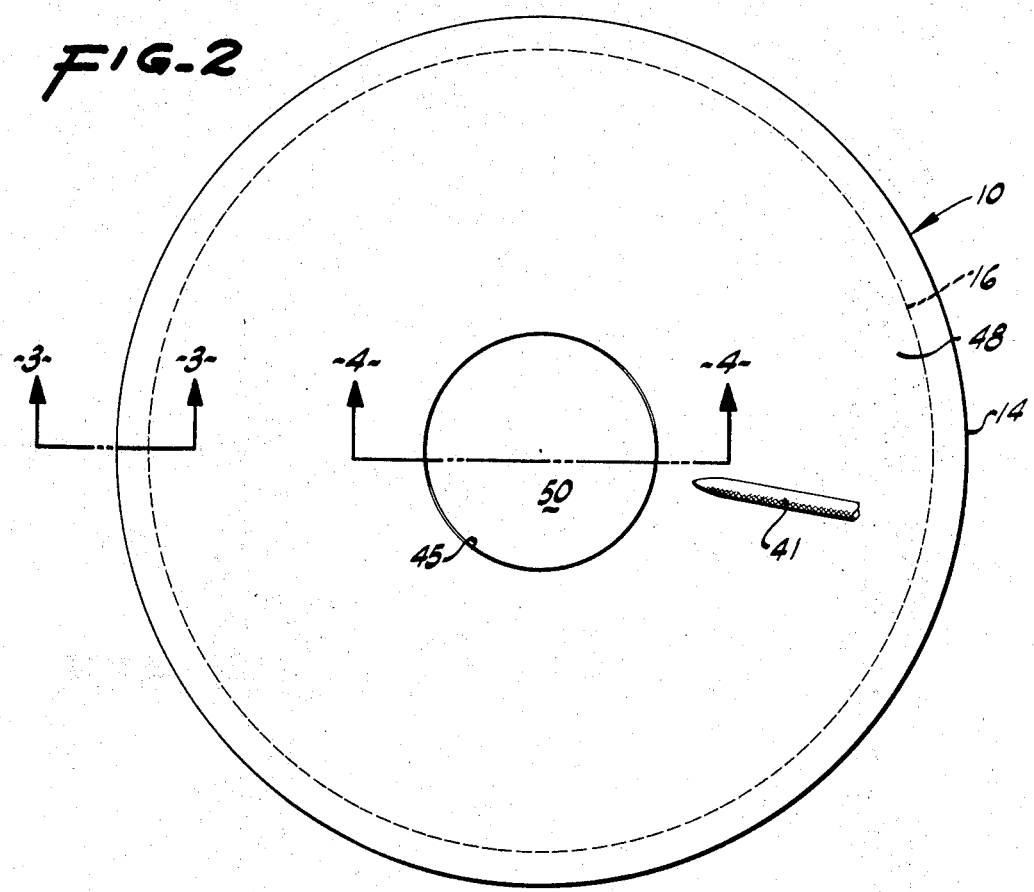
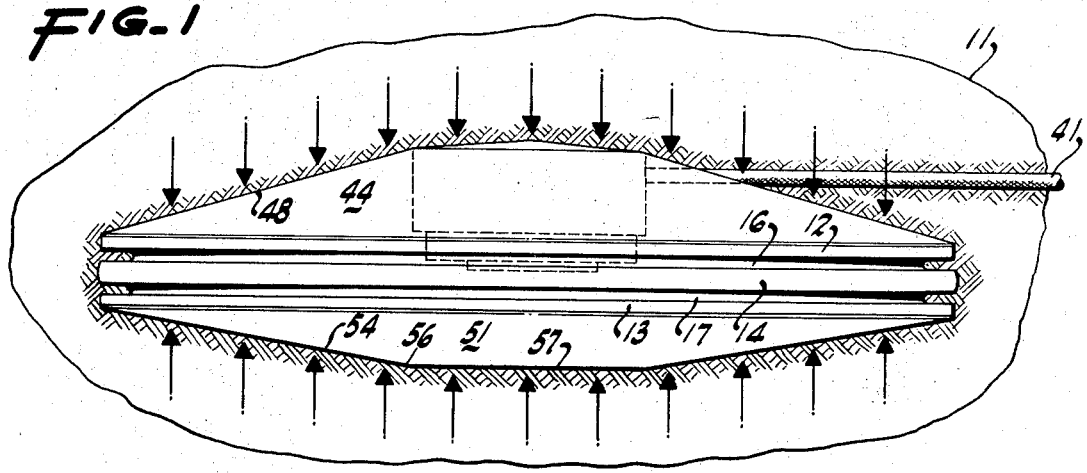
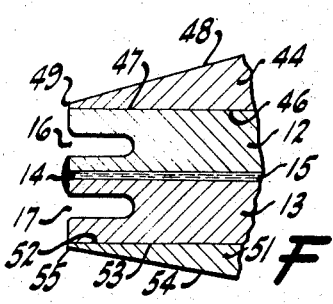
INVENTOR.
ROY W. CARLSON
BY John W. Graham
ATTORNEY United States Patent Office 3,529,468
Patented Sept. 22, 1970

3,529,468
METER FOR MEASURING COMPRESSIVE STRESS IN EARTHEN MASSES AND THE LIKE
Roy W. Carlson, Berkeley, Calif., assignor to Teledyne, Inc., Los Angeles, Calif., a corporation of Delaware
Filed Jan. 2, 1968, Ser. No. 694,615
Int. Cl. G01n 3/00
U.S. Cl. 73—88.5                    15 Claims

ABSTRACT OF THE DISCLOSURE

A remotely reading meter for measuring compressive stress in a mass within which the meter is embedded. The meter is especially suited for use in masses comprised of earthen and other granular materials; and it includes a pair of load-receiving structures movable relative to each other in the direction of the compressive loadings applied thereto and to an amount corresponding to the magnitude of any such loading. Sensor means for determining the extent of any such relative movement produces a response representative thereof and indicative, therefore, of the magnitude of the compressive-stress loading applied to the meter. In profile, the meter is thin along its outer peripheral edges and gradually increases in thickness toward the center portion thereof so that abrupt discontinuities or other disturbances in an encapsulating mass as a consequence of the presence of the meter therein are avoided. In a geometric sense, the profile configuration of each of the two halves of the meter as defined by a center plane therethrough is substantially proportional to the natural deflection curve of a semi-infinite elastic solid having an area like that of the meter and subjected to a substantially uniform load.

---

This invention relates to a stress meter and, more particularly, to a meter for measuring the compressive stress within a body or mass of material encapsulating the meter therewithin. The stress meter is especially useful in measuring compressive stress within granular masses including earthen masses such as clay, sand, gravel and rock, and non-earthen masses such as grain.

In general it may be stated that stress meters used to measure unit force or stress within granular masses are of one or the other of two types respectively intended to measure interface stress and field stress. The measurement of interface stress typically concerns determination of the magnitude of the pressure developed against the face or surface of a structure by a mass bearing thereagainst, and the meter for measuring such pressure is usually embedded in the structure and has a relatively smooth outer surface substantially flush with the face thereof and against which the mass bears. No structural problems of particular significance arise from the use of such interface stress meters because the meter can be made as thick or massive as necessary and still present a flat and non-protruding outer surface to the granular mass.

The measurement of field stress typically concerns determination of the magnitude of any compressive stress occurring within the interior of a granular mass, and a meter for measuring such stress must meet certain design requirements which are difficult of attainment because both sides of the meter are necessarily exposed to the mass within which it is encapsulated. With reference to such design requirements, it can be established that the stress through an infinitely thin plate of finite compressibility must be exactly the same as the stress present in any mass of material surrounding the plate regardless of the magnitude of the associated deformations provided that the surrounding material is elastic in its behavior. An earthen mass is not perfectly elastic but its behavior approximates that of an elastic material and, therefore, an accurate determination of the field stress within an earthen mass could be made by sensing the stress in a plate of infinite thinness embedded therein and having finite compressibility. Such a thin plate having stress-sensing means associated therewith would be a "field-stress" meter.

Although finite compressibility can be provided, the idealized condition of a plate of infinite thinness is not possible of attainment in that substantial thickness is required for a field-stress meter because the force-receiving structures comprised thereby must be of sufficient thickness to resist local deformation and make the meter stable, and further because the most favored or accepted sensing element used in meters of this type is relatively large and requires provision by the meter of considerable space therefor especially in the thickness dimension, since there are large advantages to mounting the sensing element therewithin.

The consequence of not having an infinitely thin stress meter is that the stress through the meter will be somewhat different from that in the surrounding mass except when the meter and surrounding mass tend to compress by exactly the same amount. It is not possible, however, to match the compressibility of the meter with that of the surrounding materail where such material is a granular mass because the compressibility thereof changes with loading and unloading and with gradual compaction. The present invention solves this dilemma by providing a stress meter through which the stress is always slightly higher than that in the surrounding material, but by a nearly constant percentage. Also, the over pressure through the stress meter comprising the present invention is nearly uniform over the area of the stress meter due to its novel and carefully designed configuration.

More particularly, if a highly incompressible plate is embedded in a material which behaves more or less elastically and the material is subjected to an external load, the stress through the plate will always be higher than that in the surrounding material, as stated above. Even if there is only a slight difference in compressibility, the excess pressure will vary widely, but if the compressibility of the plate is less than one tenth that of the surrounding material, for example, the excess pressure through the plate will always be nearly the same percentage of the field stress even though the compressibility of the surrounding material may vary through a wide range. For example, an infinitely incompressible plate having a diameter-to-thickness ratio of ten to one, when embedded in an elastic material, will always have a stress through the plate very nearly ten percent greater than that in the surrounding material.

One might then conclude that the stress meter should be a stiff plate having sufficient uniform thickness to house the sensing element and transfer load without appreciable local deflection; but if such plate is made of sufficient thickness to house the sensing element, the excess pressure through the plate can be shown to be a large percentage of that in the surrounding material. Not only would this lead to the necessity of an excessively large and uncertain correction to observed stress, but such stiff plate of uniform thickness would disturb the surrounding material sufficiently to alter the stress being measured. An elastic analysis shows the stress near the edge of such a thick plate to be highly concentrated when the compressibilities are different, and this would be certain to cause changes in the material.

The present invention accomplishes and has for its objects, among others, the following three things which can not be attained with a stress meter in the shape of a plate of uniform thickness, no matter what its degree of compressibility. First, the new stress meter is thin near the edges thereof where thinness is vital, and such thinness makes the effective thickness of the meter much less than its maximum thickness, thereby causing the excess pressure through the stress meter to be only moderately higher than that in the surrounding material. Second, the new meter provides a gradual transition in stress from the stiff stress meter to the surrounding material, thus avoiding any high concentration of stress at the outer edge of the meter. Third, the meter is designed to cause the small and nearly constant percentage of excess pressure through the stress meter to be uniform over the whole area thereof. This last named feature is accomplished by selecting according to a trial-load analysis a profile shape for the meter such that the natural deflection of the material around the meter is proportional to the thickness thereof. The combination of reduced effective thickness, gradual transition from stress meter to surrounding material, and uniform stress over the entire stress meter area make the present invention capable of measuring stress in granular materials more accurately than heretofore.

In terms of structural composition, a field stress meter embodying the invention includes a pair of load-receiving structures defining a chamber therebetween filled with a fluid which is usually a liquid, such as mercury or oil. The structures are movable relative to each other in an axial direction or direction in which stress loadings are applied thereto, and upon any such relative movement in response to a stress loading, the volume of the chamber tends to decrease and the pressure of the fluid to rise. One of the structures is equipped with a diaphragm that deflects in response to any such pressure increase, and sensor means arranged with the diaphragm measures the deflection thereof which is proportionate to the magnitude of the stress loading applied to the meter.

The load-receiving structures are sufficiently thick to prevent appreciable bending and localized deflection thereof, and these load-receiving structures are configurated such that the meter is quite thin at the outer perimetric edges thereof and much thicker toward its center where considerable thickness can be tolerated without effecting too great a departure from the aforementioned idealized condition of infinite thinness. The sensor means are located at the center portion of the meter and of one of the structures which is sufficiently thick thereat to accommodate the space required by the sensor means.

The composite modulus of elasticity of the meter is many times greater than that of the granular mass likely to encapsulate the meter so that the compressive stress thereof is always greater by a small but nearly fixed percentage than that of the encapsulating mass, and by way of example, in a typical meter the composite modulus of elasticity thereof may be several million pounds per square inch whereas the modulus for an earthen mass is generally of the order of one hundred thousand pounds per square inch.

An embodiment of the invention is illustrated in the accompanying drawings in which:

FIG. 1 is a side elevational or profile view of a stress meter embodying the invention and being shown within an earthen body;

FIG. 2 is a top plan view of the stress meter illustrated in FIG. 1;

FIG. 3 is an enlarged, broken transverse sectional view of the stress meter taken along the line 3—3 of FIG. 2;

Figure 5:
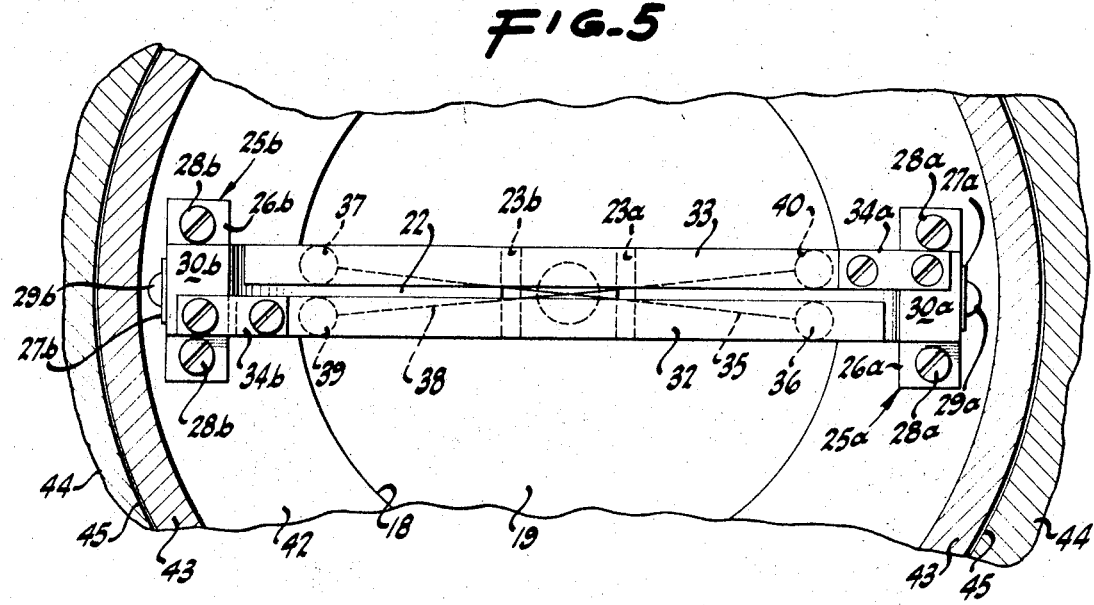
FIG. 5 is a broken longitudinal sectional view taken along the line 5—5 of FIG. 4.

The stress meter illustrated in the drawings is designated in its entirety with the numeral 10, and it is shown in FIG. 1 as being embedded within an encapsulating body or mass 11 which most often will be an earthen mass or other granular mass, although the meter may be used to measure the stress in other bodies as, for example, concrete and other coherent masses. In any case, the meter 10 is usually completely enclosed by the surrounding mass of material, as shown in FIG. 1, so that such material is in intimate contact with all of the surfaces of the meter.

Figure 4:
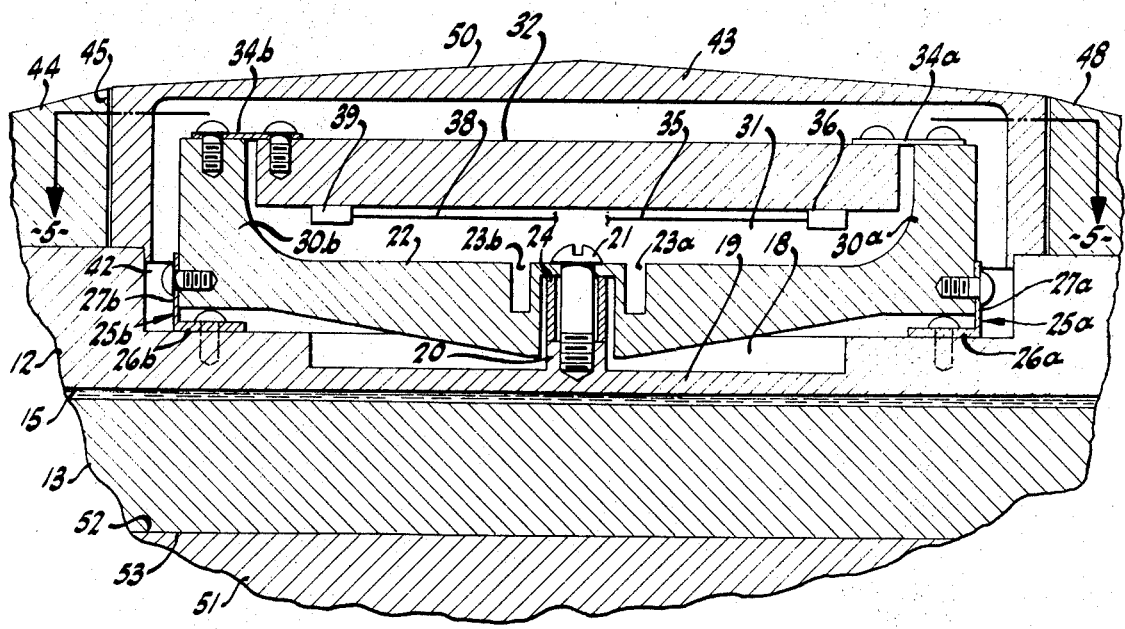
FIG. 4 is a further enlarged, broken transverse sectional view of the stress meter taken along the line 4—4 of FIG. 2.

Referring to FIGS. 3 and 4, it is seen that the meter 10 comprises a pair of load- or force-receiving structures respectively including inner plates 12 and 13 disposed in spaced-apart substantially-parallel relation and maintained in such relative positions thereof by being rigidly secured to each other along their perimetric edge portions such as by welding the plates to each other, as shown at 14. The plates 12 and 13 are cylindrical so that the peripheries thereof are circumferential, and they have essentially the same diameters. The spaced-apart plates 12 and 13 together with the circumferential wall thereabout formed by the connecting weld 14 define a chamber 15 which is filled with a fluid that is usually liquid, and the liquid employed is mercury or other dense liquid where high stress is to be measured by the meter, but in cases where the stress loadings may have smaller values, a less dense liquid such as silicone oil may be used. In special cases, the fluid used may be a gas.

The plates 12 and 13 are relatively thick, and along their outer circumferential edges they are respectively provided with inwardly cut recesses or open channels 16 and 17, each of which is continuous and extends entirely about the circumference of the associated plate. The grooves 16 and 17 are cut rather deeply into the plates and provide flexibility therefor along the outer edge portions thereof permitting the plates to bend or move toward each other when stress loadings of sufficient magnitude are applied thereto in the axial direction indicated by the force lines in FIG. 1.

As shown in FIG. 4, the upper plate 12 is provided centrally with a cylindrical recess or channel 18 which forms a relatively thin diaphragm 19 coextensive with the recess 18 and defining the bottom thereof. Evidently, any relative movement of the plates 12 and 13 toward each other tends to reduce the volume of the chamber 15 with the result that the substantially non-compressible liquid therewithin causes the diaphragm 19 to deflect outwardly and, as will be described hereinafter, such deflection of the diaphragm is sensed and used to measure the magnitude of the compressive-stress loading causing the same.

The diaphragm 19 is equipped centrally with an upwardly extending boss 20 having a threaded opening therein receiving a screw 21 used to secure a beam 22 to the boss. The beam is a generally rectangular component that progressively increases in thickness from the outer extremities toward its center and is provided with transversely-extending slots or channels 23a and 23b that are substantially parallel and are equally spaced from the transverse center of the beam on opposite sides thereof. The slots 23 are analogous in function to the annular grooves 16 and 17 described hereinbefore in that they weaken the beam along the center thereof so as to enable it to deflect upwardly, as viewed in FIG. 4, along the center portion thereof adjacent the screw 21. The screw 21 extends downwardly through the beam 22 at the center thereof, and a spacer 24 circumjacent the shank of the screw positionally locates the beam 22 at the proper elevation relative to the plate 12.

The beam 22 at its outer ends is hingedly secured to the plate 12 by L-shaped leaf springs 25a and 25b which permit the aforemention upward flexure of the beam 22 at its center. The springs 25 may be formed of spring steel and are relatively small components. By way of example, the base 26a of the spring 25a may have a transverse length of about five-eighths of an inch and a dimension in the longitudinal direction of about one-fourth of an inch. The upwardly extending leg 27a of such spring may be about one-fourth of an inch in height, have a length about one-half that of the base leg 26a, and have a thickness of approximately .010 of an inch. The spring 25b has the same dimensional relationships as the spring 25a. The base leg 26 of each spring is anchored to the plate 12 by two screws 28, as shown in FIG. 5, and the upwardly extending leg 27 of each spring is secured to the beam 22 by a single screw 29.

The beam 22 at the outer extremities thereof is equipped with upwardly extending legs 30a and 30b which are formed integrally with the beam and terminate a spaced distance above the intermediate central portion thereof. Thus, the beam 22 in longitudinal section, as shown in FIG. 4, is generally U-shaped and provides an elongated space 31 extending between the legs in which are located a pair of longitudinally-extending carrier bars 32 and 33. The carriers are oriented in spaced-apart parallelism, and the carrier 33 is secured to the upwardly extending leg 30a of the beam 22 by a leaf spring 34a connected to both the leg and carrier by screws passing through the spring and into the respectively underlying leg and carrier. Similarly, the carrier 32 is mounted upon the leg 30b of the beam 22 by a leaf sping 34b.

It is evident from study of the structural arrangement that if the diaphragm 19 is deflected upwardly as a consequence of compressive-stress loadings being applied to the meter, the beam 22 will be deflected upwardly therewith along its central section, whereupon the legs 30a and 30b will pivot outwardly about the hinges defined by the respectively associated L-shaped leaf springs 25a and 25b. Thus, the longitudinal distance between the legs 30a and 30b at the upper edges thereof will increase with the result that the carriers 32 and 33 will be displaced longitudinally relative to each other with the carrier 32 being moved toward the left and the carrier 33 being moved toward the right, as viewed in FIG. 5.

The carriers 32 and 33 support coils or wire stretched between the spools in such a manner that relative movement between the carriers 32 and 33 changes the tension in certain sections of the wire. Such changes in wire tension effect corresponding changes in the condition of associated circuitry operative to provide indicia indicative of the magnitude of any stress loading applied to the meter and which stress loading causes the changes in wire tension. Although the sensor means comprised of this arrangement is of the type disclosed in detail in my prior Pats. No. 2,148,013 and No. 2,036,458 to which reference may be made for further information concerning such details, for convenience hereof it is noted that the wire may be steel or other highly elastic wire, and in FIG. 5 one of the tension-variable wire lengths is denoted schematically with the numeral 35 and extends between spools 36 and 37 respectively mounted upon the carriers 32 and 33 adjacent the free ends thereof, and the other tension-variable wire length is denoted with the numeral 38 and extends between spools 39 and 40 respectively mounted upon the carriers 32 and 33 adjacent the spring-equipped fixed ends thereof.

As a further convenience it is noted that with such X-shaped disposition of the wire lengths 35 and 38, the tension in one is increased concurrently with the tension in the other being decreased by any relative displacement of the ends 30a and 30b of the beam 22. For example, if the beam 22 is deflected upwardly at its center so that the upwardly extending ends 30a and 30b thereof rotate outwardly, the consequent increase in the space therebetween and corresponding movement of the carrier 32 toward the left and carrier 33 toward the right, as viewed in FIG. 5, results in the spools 36 and 37 being displaced longitudinally toward each other which decreases the tension in the wire 35 and also results in the spools 39 and 40 being displaced longitudinally away from each other which increases the tension in the wire 38. This tension differential provides automatic compensation for the effects of temperature variations which might otherwise adversely influence the accuracy of the electrical response to any deflection of the beam 22. As shown in FIGS. 2 and 3, the wires 35 and 38 are encased within a conduit 41 exteriorly of the meter, and such conduit extends through the earthen mass 11 to connect the meter electrically with remotely located instrumentation. Since the electrical characteristics of the sensor means are not in themselves required for an understanding of the present invention, no further details concerning such means and any circuitry used therewith will be set forth.

The sensor means including the beam 22, carriers 32 and 33, and the various components associated therewith are reduced in overall height so far as is practicable by placing the same within a large recess 42 formed about the channel 18 that defines the diaphragm 19, and such recess 42 is cut into the plate 12 along the upper edge thereof. The sensor means are enclosed to protect the same from the earthen mass 11 by a cover 43 which, in the form shown, has a depending cylindrical wall that seats upon the plate 12 and is welded or otherwise fixedly secured thereto; and in the usual instance, the interconnection between the cover and plate defines a fluid-tight compartment which may be filled with a suitable insulating liquid, such as castor oil, or a high viscosity mineral oil, and the oil may be introduced while hot so that as it cools a small vacuous space is formed within the compartment to allow for volume changes thereof owing to changes in temperature and to deflections of the diaphragm 19.

For some environments, it may be desirable to fill such compartment with a gaseous fluid such as nitrogen preferably maintained at a relatively low pressure so as to minimize internal pressure variations which otherwise might be caused by deflections of the diaphragm 19 and temperature variations to which the meter could be subjected. In order to fill the compartment about the sensor means, a filling hole, not shown, can be provided through the cover 43 or through the plate 12, and such hole can be closed by a screw, all as shown and described in my aforementioned Pat. No. 2,148,013. A similar filling hole and screw-equipped closure therefor are used to fill the chamber 15 with liquid, and again, this arrangement is disclosed in such Pat. No. 2,148,013.

The load-receiving structures each have a somewhat cone-shaped external configuration when viewed in profile or side elevation, as shown especially in FIGS. 1 and 3. Accordingly, each such structure is quite thin adjacent the circumferential edge thereof and progressively enlarges in thickness toward its center portion. As concerns the lower load-receiving structure, it has an inverted frusto-conical configuration in that the taper of the outer surface thereof terminates some distance from the center, and is thereafter relatively flat. The upper load-receiving structure is generally similar except that the frusto-conical outer surface thereof is not inverted, and the cover 43 which defines a part of such outer surface tapers upwardly toward the center but at a slightly lesser angle of inclination.

In terms of the specific structural embodiment illustrated in the drawings, the uper load-receiving structure comprises the aforementioned plate 12 which has a substantially flat upper surface, and seated thereon is a force-transferring component 44 in the form of an annulus provided centrally with a ring-shaped opening 45 dimensioned to receive the cover 43 therewithin. As shown in FIG. 4, the walls of the opening 45 are very close to the outer surface of the depending walls of the cover 43 so that very little space is defined therebetween. The load-transferring component 44 has a smooth planar bottom surface 46 that seats upon and is adhesively (an epoxy resin, for example) or otherwise secured to the similarly smooth planar upper surface 47 of the plate 12. The upper outer surface 48 of the load-transferring component 44 inclines upwardly from the thin outer edge 49 thereof at a uniform slope to the central opening 45. The outer surface 48 of the component 44 tends to be continued by the outer surface 50 of the cover 43, but such continuation is at a lesser slope than that of the surface 48.

In a similar manner, the lower load-receiving structure includes a load-transferring component 51 having a smooth planar upper surface 52 that engages the smooth planar lower surface 53 of the plate 13 and is adhesively or otherwise secured thereto. The outer surface 54 of the load-transferring component 51 tapers downwardly from its thin outer edge 55 to a central location, denoted 56 in FIG. 1, generally in line with the opening 45 in the upper load-transferring component 44. Thereafter the outer surface of the component 51 is substantially flat, as shown at 57.

In the use of the stress meter, it is oriented so that the direction of the compressive stress to be measured is toward and against the outer surfaces 48 and 54 of the load-receiving structures and substantially normal to the planes of the plates 12 and 13 respectively forming the inner components of such structures. Usually in use of the meter it is placed within an encapsulating body such as an earthen mass, and a strap or band which can be cloth, plastic, or impregnated paper, for example, is wrapped about the periphery of the device so as to cover the open channels 16 and 17 and thereby prevent ingress of material thereinto. When embedded within such body, the meter is responsive to compressive stress substantially irrespective of its origin, external loads applied to the body or mass for example, but it is substantially independent of the amount of deformation associated with such stress.

The channels 16 and 17 formed along the periphery of the meter permit slight bending or flexural displacements enabling the plates 12 and 13 to move axially relative to each other in responsive to compressive loads applied to the meter in the directions shown in FIG. 1. As explained hereinbefore, any such stress-responsive displacements of the plates cause an increase in the hydrostatic pressure of the liquid within the chamber 15 thereby resulting in the relatively thin diaphragm 19 deflecting outwardly in response thereto. Any such deflection of the diaphragm 19 causes the beam 22 to bend upwardly at its center portion, and in this respect the beam is elastically supported adjacent the center thereof because of the reduction in its inherent stiffness resulting from the presence of the transverse slots 23a and 23b.

When the center portion of the beam is deflected upwardly, the two horizontal arms or branches thereof respectively disposed on opposite sides of the slots 23a and 23b rotate upwardly about the hinges respectively defined by the elastic springs 25a and 25b, and the consequent distortion of the beam adjacent the center thereof is accommodated by the elasticity of the support therefor defined by the thin wall segments bordering the slots 23. Thus, as explained heretofore, the upper ends of the legs 30a and 30b spread apart to increase the tension in the wire 38 and to decrease the tension in the wire 35 thereby changing the resistance values thereof, which changes in values are measured in an appropriate circuit, not shown, to provide indicia representative of the magnitude of the compressive stress causing the changes.

Although the peripheral edge portions of the plates 12 and 13 must be sufficiently flexible to permit the compressive loads applied thereto to be transmitted to the liquid within the chamber 15, for reasons of stability such edge portions customarily carry about ten to twenty percent of the entire compressive load applied to the meter so that the interconnection defined by the weld 14 along the periphery of the plates must be sufficiently strong to accommodate such loads. The plates themselves must be sufficiently thick and therefore resistant to bending that the compressive loadings applied thereto are distributed along the plates without causing the same to deflect into contact with each other at any point therealong, which contact would make the hydrostatic pressure of the fluid in the chamber 15 indeterminate and the stress measurement provided by the meter inaccurate.

By way of indicating the dimensional order of a typical meter, the structure is cylindrical and the outer diameter, thereof is about twelve inches. The maximum thickness or axial dimension of the lower load-receiving structure as measured from the center line of the chamber 15 to the surface 57 is about one and one-fourth inches, and the corresponding dimension of the upper load-receiving structure measured from the center line of the chamber 15 to the top of the opening 45 is about one and three-quarter inches; wherefore the overall thickness of the meter at the center thereof approximates three inches. Each of the plates 12 and 13 has a maximum thickness of about one-half inch.

The generally conical configuration of the outer surface of each of the load-receiving structures is especially advantageous for a number of reasons including the significant reduction it affords in the effective diameter-to-thickness ratio of the meter. In this respect, although the ratio of diameter-to-center-thickness of the meter may be say four to one, its performance is similar to that of a meter having a uniform thickness and a diameter-to-thickness ratio of nearly ten to one. A conventional stress meter of uniform thickness would need to have an undesirable large diameter-to-thickness ratio and would differ markedly in the stress therethrough, which is the stress that it measures, from the field stress to which it is subjected and, therefore, the stress measurements made by such meter would not bear a close relation to the actual value of the field stress. The improved stress meter 10 having the configuration described has a stress therethrough which does not bear such close relation to the actual value of the field stress being measured and is consistently higher by a substantially constant amount which typically is of the order of ten percent in excess of the field stress. Thus, such difference can be included in the calibration of the meter as a substantially constant parameter.

The modulus of the elasticity of soil varies so widely that it is not practicably possible to match it with a stress measuring meter having essentially the same modulus, for in any particular soil the modulus thereof will vary significantly from loading to loading and, for example, on the first loading thereof the value of the modulus might be only about one-tenth of the value of the modulus occurring either on subsequent loadings or on unloadings of the soil. Accordingly, a meter for measuring field stress in soil and other granular masses most appropriately has a composite modulus of elasticity many times that of the mass being tested and a favorable shape, as heretofore described, so that the stress through the meter is always greater than the field stress by a small, nearly constant percentage.

Generally, as indicated hereinbefore, the modulus of elasticity of soil is of the order of 100,000 pounds per square inch although it may vary widely therefrom, and the equivalent composite modulus of elasticity of a typical stress meter made in accordance with the present invention is several million pounds per square inch. Such a composite elastic modulus, which has been accurately determined in tests by interferometer techniques using monochromatic light, although being considerably less than that of steel (usually taken to be about 29,000,000 pounds per square inch) compares well with computed values for the meter when taking into account all of the contributions to compressibility including compressibility of the diaphragm 19, of the plates 12 and 13, and of the liquid within the chamber 15, and any bulging or deformation of the diaphragm 19 and of the flexible periphery of the plates 12 and 13.

The profile configuration of the meter provides the maximum thickness or axial dimension thereof at its center portion where such dimension is tolerable and whereat the sensor means are located. It may be observed that such thick dimension is nevertheless minimized by the particular arrangement of the sensor means by which it converts vertical or axial displacements of the load-receiving structures into horizontal or longitudinal displacements of the legs 30a and 30b of the beam 22 and of the carriers 33 and 32 which are respectively secured to such legs. Thus, the rather long space required by the carriers 32 and 33 and components associated therewith is converted from what would otherwise be a generally vertical or axial dimension increasing the thickness of the meter into a horizontal or longitudinal dimension readily accommodated within the upper load-receiving structure thereof without excessively increasing the thickness dimension of the meter.

It may further be observed that the sensor means are essentially symmetrical particularly about the transverse center thereof (i.e., through the screw 21 parallel to the slots 23a and 23b) which is especially advantageous in that it results in concurrent movement of each of the carriers 32 and 33 in response to the application of compressive stress of the meter, and therefore reduces the amount of movement that otherwise would have to be provided if only one of the carriers were movable. The sensor means and diaphragm 19 thereof are further disposed so that compressive force applied across the meter is effectively transmitted through the diaphragm and to the beam 22 so as to be substantially normal to the plane thereof and particularly to the center portion of the beam between the slots 23a and 23b, thereby obviating transmission to the beam of any non-normal error-producing force components.

The elastic hinges defined by the L-shaped springs 25a and 25b positionally relate the beam 22 to the plate 12 and maintain the same in a predetermined condition of alignment; and in an analogous sense, the leaf springs 34a and 34b maintain the respectively associated carriers 33 and 32 in predetermined positional relationships relative to each other and to the legs 30a and 30b of the beam 22. All of these spring supports eliminate any play between the components respectively connected thereby which would be destructive of accuracy of the meter readings since the total motion of the sensor components is exceedingly limited.

Each of the load-receiving structures respectively comprising an inner plate and an outer load-transferring component could be integral, and they are made as individual elements for purposes of structural convenience. Such two structures together comprise a single load-receiving structure having oppositely facing load-receiving surfaces against which stress loadings are applied to the meter. Considering such structure in the nature of an integer, the facing, substantially-parallel surfaces thereof defining the chamber 15 form portions or elements which are movable axially in response to stress loadings applied to the meter.

The profile of the meter, which varies in thickness from a relatively small axial dimension adjacent its cylindrical periphery toward a greater axial dimension along its center portion, defines a configuration that minimizes stress variation over the meter whenever it tends to compress differently than any surrounding mass of material within which it is located and, as explained hereinbefore, such stress-minimizing configuration is a composite of the profile configurations of the two individual load-receiving structures, each profile configuration of which is substantially proportional to the shape of the natural deflection curve of a semi-infinite elastic solid having a load-receiving area of substantially the same size as that of the meter and subjected to a substantially uniform stress loading. As concerns profile configuration, the effective thickness of the meter (or of each of the load-receiving structures thereof) is intermediate the maximum axial dimension of the meter at its center and its minimum thickness adjacent its peripheral edge, and such effective thickness is reduced as the minimum dimension is decreased.

While in the foregoing specification an embodiment of the invention has been set forth in considerable detail for purposes of making a complete disclosure thereof, it will be apparent to those skilled in the art that numerous changes may be made in such details without departing from the spirit and principles of the invention.

What is claimed is:

1. A device for measuring compressive stress loadings applied thereto, comprising a pair of load-receiving structures rigidly secured to each other along their perimetric edge portions in facing juxtaposition and having outer oppositely facing load-receiving surfaces against which any such stress loading is applied, said structures having also substantially parallel inner surfaces disposed in axially spaced relation inwardly of said perimetric edge portions to define a chamber therebetween substantially coextensive in transverse extent with said outer surfaces and being movable axially relative to each other to an extent representative of the magnitude of any such stress loading applied to said outer surfaces, and sensor means for determining the extent of any such relative movement to produce a corresponding response function, the exterior of said device being defined at least in part by said load-receiving outer surfaces and each of said structures varying in profile along said outer surfaces and across said chamber from a relatively small axial dimension adjacent the periphery of said chamber toward a greater axial dimension along the center portion thereof.

2. A device for measuring compressive stress loadings applied thereto, comprising load-receiving structure having oppositely facing load-receiving surfaces against which any such stress loading is applied and having also portions thereof movable axially relative to each other to an extent representative of the magnitude of any such stress loading applied to said surfaces, and sensor means for determining the extent of any such relative movement to produce a corresponding response function, the exterior of said device being defined at least in part by said load-receiving surfaces and varying in profile from a relatively small axial dimension adjacent its periphery toward a greater axial dimension along the center portion thereof, each of said load-receiving surfaces being generally frusto-conical.

3. A device for measuring compressive stress loadings applied thereto, comprising load-receiving means having oppositely facing load-receiving surfaces against which any such stress loading is applied and having also portions thereof movable axially relative to each other to an extent representative of the magnitude of any such stress loading applied to said surfaces, and sensor means for determining the extent of any such relative movement to produce a corresponding response function, the exterior of said device being defined at least in part by said load-receiving surfaces and varying in profile from a relatively small axial dimension adjacent its periphery toward a greater axial dimension along the center portion thereof, said load-receiving means comprising a pair of load-receiving structures respectively having an inner plate and an outer load-transferring component in load-transmitting engagement therewith and providing the load-receiving surface of the structure comprised thereby.

4. The device of claim 3 in which one of said load-transferring components is an annulus having a central opening therein to accommodate portions of said sensor means.

5. The device of claim 1 in which the aforesaid variation in the axial dimensions thereof defines a configuration minimizing stress variation over said load-receiving structures whenever they tend to compress differently than any surrounding mass of material within which said device is located.

6. The device of claim 1 in which the composite modulus of elasticity thereof is greater than that of any granular mass in which the device is likely to be embedded and is in excess of one million pounds per square inch.

7. The device of claim 1 in which each of said outer load-receiving surfaces has a profile configuration substantially proportional to the shape of the natural deflection curve of a semi-infinite elastic solid having a load-receiving area of substantially the same size as that of said device and subjected to a substantially uniform stress loading, the profile configurations of said load-receiving outer surfaces defining the aforesaid stress-minimizing configuration of aid device.

8. A device for measuring compressive stress loadings applied thereto, comprising load-receiving structure having oppositely facing load-receiving surfaces against which any such stress loading is applied and having also portions thereof movable axially relative to each other to an extent representative of the magnitude of any such stress loading applied to said surfaces, and sensor means for determining the extent of any such relative movement to produce a corresponding response function, the exterior of said device being defined at least in part by said load-receiving surfaces and varying in profile from a relatively small axial dimension adjacent its periphery toward a greater axial dimension along the center portion thereof, said sensor means including motion-converting structure operatively responsive to any such relative axial movement of said portions to convert such axial movement into motion transversely oriented with respect thereto.

9. The device of claim 8 in which said motion-converting structure comprises a longitudinally extending beam equipped at its ends with axially disposed legs, said beam being hingedly constrained against axial movement adjacent its ends and being axially movable throughout its center portion in response to any such relative axial movement, whereby the free end portions of said axially disposed legs move concurrently and oppositely in directions transverse to such axial movement of said beam adjacent the center portion thereof.

10. A device for measuring compressive stress loadings applied thereto, comprising load-receiving means having oppositely facing load-receiving surfaces against which any such stress loading is applied and having also portions thereof movable axially relative to each other to an extent representative of the magnitude of any such stress loading applied to said surfaces, and sensor means for determining the extent of any such relative movement to produce a corresponding response function, the exterior of said device being defined at least in part by said load-receiving surfaces and varying in profile from a relatively small axial dimension adjacent its periphery toward a greater axial dimension along the center portion thereof, said load-receiving means including a pair of load-receiving structures having substantially parallel surfaces disposed in axially-spaced relation and comprising said axially-movable portions, said load-receiving structures being rigidly secured to each other along their perimetric edge portions and defining a fluid-filled chamber between said parallel surfaces, one of said load-receiving structures being equipped with a diaphagm deflectable in response to pressure changes in such fluid resulting from any relative axial movement of said parallel surfaces, said sensor means being responsive to any such deflections in said diaphragm.

11. The device of claim 10 in which the perimetric edge portions of said load-receiving structures are substantially cylindrical, and in which each of said load-receiving surfaces is generally frusto-conieal.

12. The device of claim 11 in which said sensor means includes motion-converting structure operatively responsive to any such deflections of said diaphragm resulting from relative axial movement of said parallel surfaces to convert such deflections into motion transversely oriented with respect to such relative axial movement.

13. The device of claim 12 in which said motion-converting structure comprises a longitudinally extending beam secured at its center portion to said diaphragm so as to be movable therewith and equipped at its ends with axially disposed legs, said beam being hingedly secured adjacent its outer ends to the load-receiving structure provided with said diaphragm to constrain such ends of said beam against axial movement, whereby the free end portions of said axially disposed legs move concurrently and oppositely in diections transverse to such relative axial movement of said load-receiving structures upon any diaphragm-enforced movement of the center portion of said beam.

14. The device of claim 10 in which the aforesaid variation in the axial dimensions thereof defines a configuration minimizing stress variation over said load-receiving structures whenever they tend to compress differently than any surrounding mass of material within which said device is located.

15. The device of claim 14 in which each of said load-receiving surfaces has a profile configuration substantially proportional to the shape of the natural deflection curve of a semi-infinite elastic solid having a load-receiving area of substantially the same size as that of said device and subjected to a substantially uniform stress loading, the profile configurations of said load-receiving surfaces defining the aforesaid stress-minimizing configuration of said device.

References Cited
UNITED STATES PATENTS

| | | | |
|---|---|---|---|
| 3,005,337 | 10/1961 | Waziri | 73—141 |
| 3,388,598 | 6/1968 | Hall | 73—88 X |
| 3,410,135 | 11/1968 | Reynand | 73—141 |

JERRY W. MYRACLE, Primary Examiner

U.S. Cl. X.R.

73—398, 406